United States Patent
Noelle

(10) Patent No.: US 12,264,419 B2
(45) Date of Patent: Apr. 1, 2025

(54) RECYCLING FACILITY FOR NON-WOVENS

(71) Applicant: ANDRITZ PERFOJET SAS, Montbonnot-Saint-Martin (FR)

(72) Inventor: Frédéric Noelle, Saint-Nazaire-les-Eymes (FR)

(73) Assignee: Andritz Perfojet SAS, Montbonnot-Saint-Martin (FR)

( * ) Notice: Subject to any disclaimer, the term of this patent is extended or adjusted under 35 U.S.C. 154(b) by 1121 days.

(21) Appl. No.: 16/967,793

(22) PCT Filed: Feb. 14, 2019

(86) PCT No.: PCT/EP2019/053736
§ 371 (c)(1),
(2) Date: Aug. 6, 2020

(87) PCT Pub. No.: WO2019/162196
PCT Pub. Date: Aug. 29, 2019

(65) Prior Publication Data
US 2021/0040653 A1    Feb. 11, 2021

(30) Foreign Application Priority Data
Feb. 22, 2018    (FR) .................................... 18 70191

(51) Int. Cl.
*D04H 1/492*    (2012.01)
*D01G 11/02*    (2006.01)
*D04H 1/42*    (2012.01)

(52) U.S. Cl.
CPC ............... *D01G 11/02* (2013.01); *D04H 1/42* (2013.01); *D04H 1/492* (2013.01)

(58) Field of Classification Search
CPC ......... D01G 11/02; D01G 11/00; D04H 1/492
See application file for complete search history.

(56) References Cited

U.S. PATENT DOCUMENTS

| | | | | |
|---|---|---|---|---|
| 3,941,530 A | | 3/1976 | Platt | .............................. 425/83 |
| 4,032,274 A | * | 6/1977 | Troy | ....................... D04H 1/72 |
| | | | | 264/114 |
| 4,416,936 A | * | 11/1983 | Erickson | .............. D04H 1/4374 |
| | | | | 28/240 |
| 4,426,753 A | * | 1/1984 | Oellers | .................. D01G 23/02 |
| | | | | 19/83 |
| 6,061,876 A | * | 5/2000 | Rowe | ..................... D01G 15/20 |
| | | | | 19/107 |

(Continued)

FOREIGN PATENT DOCUMENTS

| | | | | |
|---|---|---|---|---|
| CN | 201406492 Y | 2/2010 | ............ | D01G 11/04 |
| EP | 0 293 590 | 12/1988 | ............ | D01G 11/04 |
| FR | 893 215 | 6/1944 | | |

(Continued)

OTHER PUBLICATIONS

International Search Report mailed Mar. 29, 2019 in related application No. PCT/EP2019/053736.

*Primary Examiner* — Tajash D Patel
(74) *Attorney, Agent, or Firm* — Renner, Kenner, Greive, Bobak, Taylor & Weber

(57) ABSTRACT

Recycling facility for non-wovens, comprising a fraying roller (8), a flat carding machine (9) without workers mounted downstream of the fraying device (8) in the direction of travel of the non-wovens in the facility.

4 Claims, 3 Drawing Sheets

(56) References Cited

U.S. PATENT DOCUMENTS 6,378,179 B1 * 4/2002 Hirsch ................. D04H 1/4274
28/103

FOREIGN PATENT DOCUMENTS

| FR | 1 477 755 | 4/1967 | | |
|----|-----------|--------|---|---|
| WO | WO-2017092791 A1 * | 6/2017 | ........... | D04H 1/4266 |
| WO | WO-2021228514 A1 * | 11/2021 | ............. | B32B 5/022 |
| WO | WO-2023022979 A1 * | 2/2023 | | |

* cited by examiner

RECYCLING FACILITY FOR NON-WOVENS

CROSS-REFERENCE TO RELATED APPLICATION

This is a § 371 application of International patent application number PCT/EP2019/053736 filed Feb. 14, 2019, and French application FR 18 70191 filed Feb. 22, 2018.

TECHNICAL FIELD

The present invention relates to the recycling of non-woven production waste consolidated by water jets known as spunlace and, more particularly, to the recycling of production selvedges.

BACKGROUND ART

A production line of non-wovens consolidated by water jets includes, from upstream to downstream, machines that open and mix fibres, one or more fibre carding machines forming webs or mats, a machine for consolidation by water jets, a drying oven and a rewinder. The gross production width is generally between 2.5 and 4.5 m. Production is either wound and cut to size on-line at a production speed of generally between 50 m/min and 300 m/min, or wound onto jumbo reels that are then unwound and cut to size off-line at higher speeds of up to 1,000 m/min.

Selvedges generally account for 3 to 5% of production. They are recycled increasingly frequently for economic reasons. In this case, they are frayed with fraying devices to separate the fibres, then returned to the opening and mixing machines to be recycled into production.

The principal problem with recycling selvedges with known fraying solutions is that they have a significant impact on the quality of the end product. Numerous bundles of fibres occur in non-wovens, nibs or knots known as "neps", caused by insufficient separation of fibres during fraying. It is common to find bundles of fibres 1 mm in diameter, or even more. A consequent reduction in the average length of the fibres occurs during fraying which has a negative impact on the strength of non-woven products.

Average lengths are less than 25 mm for fibres with an initial length of 38 mm.

A solution has been found, and this is the purpose of the present invention, for recycling selvedges and production waste of non-woven spunlace, that not only does not produce faults in non-wovens visible to the naked eye, but is also better in terms of the average length of recycled fibres.

SUMMARY OF THE INVENTION

The recycling facility for non-wovens according to the invention comprises a fraying device. This is characterised by a flat carding machine without workers mounted downstream of the fraying device in the direction of travel of the non-wovens and fibres in the system. Preferably, the carding machine is fitted immediately after the fraying device, without any other intermediate processing device, but still with its feed path and intermediate storage silo to control the supply of fibres.

The flat carding machine is used to process cotton fibres and in cotton spinning systems. It has quasi-flat metal brushes or flat linings called caps, that are linked in an endless chain that partially surrounds the large drum. The fibres are frayed between the caps and the drum, then transferred to the carding cylinder. The flat carding machine, which up to now has only been used for non-wovens, has the advantage of carding the fibres in a managed manner, compared with a carding machine of a different type, in particular a carding machine with workers, as used as the principal carding machine in a non-wovens production facility. It separates the fibres cleanly and isolates nibs, knots, and other bundles that reduce quality, because the caps have a carding action over a large area of the drum and eliminate nibs or knots of fibres when these are not opened or do not unravel.

Nibs are eliminated by the cap cleaning device. The caps provide a strong carding action and eliminate knots, nibs and unravelling of insufficiently open fibres to be recycled in the production of non-wovens.

FR 893 215 proposes the use of a carding machine with workers. The workers have fibre carding action limited to their working area with respect to the drum, and thus over a very small area. Furthermore the workers do not have a cleaning function and do not eliminate knots and nibs as do caps. In the case of very short fibres, as found in frayed non-wovens, the workers may create additional knots and nibs.

In the most successful method of implementation of the facility according to the invention, the fraying device has a fraying roller with conical, or possibly cylindro-conical workers. The height of the workers, which corresponds to the height of the cone, is from 5 to 25 mm, preferably from 10 to 20 mm. The workers have a base diameter of 2 to 8 mm, preferably 2 to 3 mm. The distance between centres of the workers is preferably between 5 and 20 mm. The workers are inclined in the direction of rotation of the fraying roller and form an angle of 20° to 50° to the perpendicular to the exterior lateral surface of the fraying roller.

This fraying roller with workers produces managed fraying, which pays less attention to the length of the fibres than more aggressive linings with triangular teeth.

Preferably before, in particular immediately before fraying, the selvedges are sized with water to which a sizing product has been added. The sizing is applied, preferably, by spraying with jets a solution of water and the sizing product of 0.5% to 10% by weight depending on the product used. For example, a good sizing product is Lertisan from the German company Zschimmer & Schwarz, which contains polyglycol and an antistatic agent. Sizing products consist mainly of fatty alcohol and antistatics, for example alcohol in C8 to C12 ethoxylate.

The invention also covers the application of a facility according to the invention for the manufacture of non-wovens in a facility comprising, upstream and downstream successively, a device for opening and mixing fibres, a principal carding machine of a type other than a flat carding machine, in particular a carding machine with workers, a device for consolidation by water jets, a drier and a rewinder. A device is provided for sending fibres leaving the flat carding machine to the device for opening and mixing fibres, with intermediate storage where applicable.

The manufacturing facility includes a cutting device downstream of the rewinder. Offcuts of non-wovens are sent to the fraying device, preferably first passing through the sizing device.

The recycling fibres obtained recycled at variable percentages, generally from 3% to 10%, either directly fed back into a loading/weighing machine for the opening/mixing of the production line, or via a baler and a loading/weighing machine for opening/mixing on the production line.

The fibres obtained exhibit knots or neps less than 0.12 mm in diameter, preferably 0.10 mm diameter. The length of the fibres is at least 70% of their initial length. The average length of the fibres is greater than 26 mm for fibres with an initial length of 38 mm.

BRIEF DESCRIPTION OF THE DRAWINGS

In the attached drawings, given purely as examples.

DETAILED DESCRIPTION OF THE INVENTION

Figure 1:
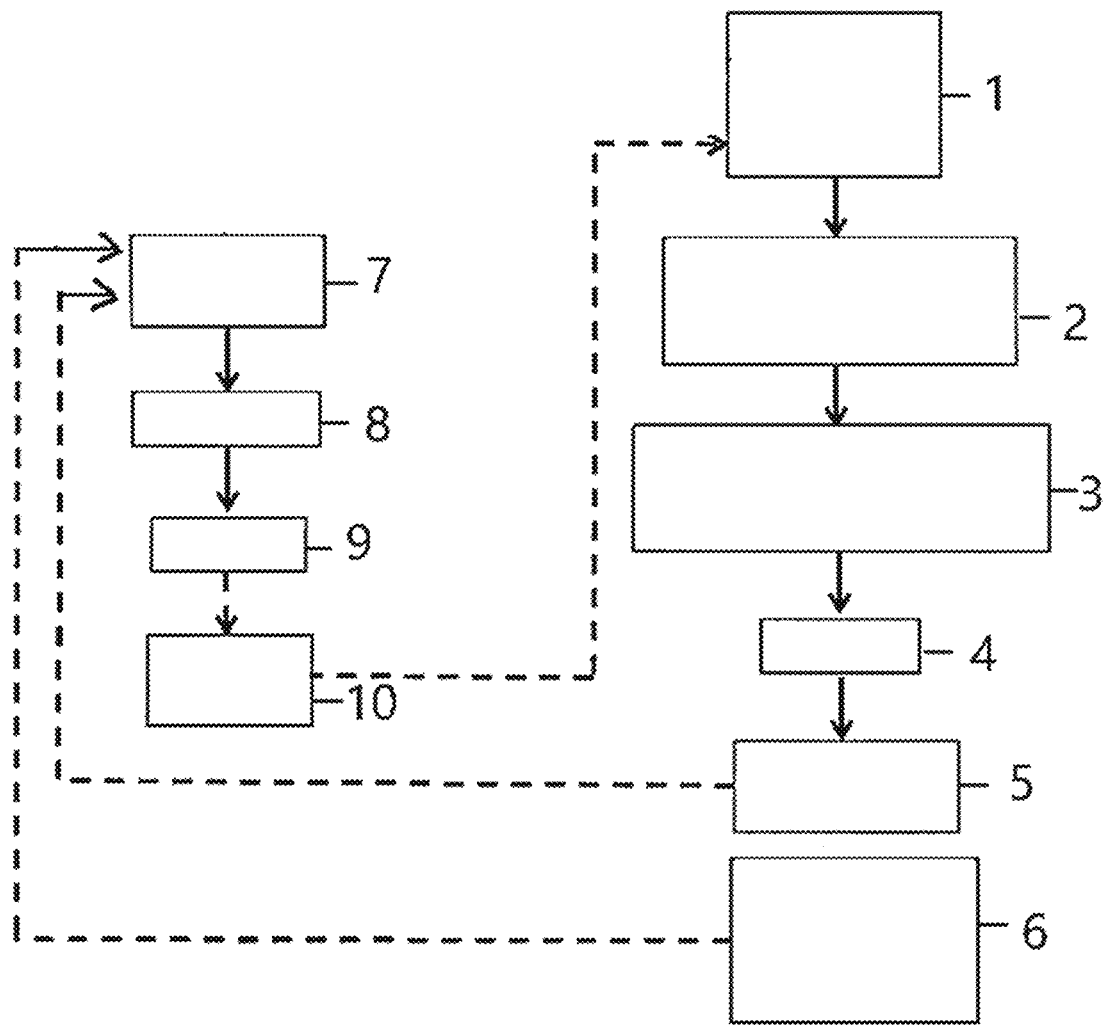
FIG. 1 is a flow diagram of a recycling facility according to the invention and of the associated non-wovens production line.

The non-wovens production line shown in FIG. 1 includes a device 1 for opening and mixing fibres that sends the opened and mixed fibres to a carding machine 2 of a type other than a flat carding machine, in particular to a carding machine with workers. The carded web leaving carding machine 2 is consolidated in a device 3 for consolidation by water jets into a wet web which is sent to a drier 4. The dried web goes to a rewinder 5, if applicable, before being unwound, then cut and rewound at 6.

The lint from the rewinder 5 and the cutting device 6 is sent to a sizing device 7, then to a fraying roller with workers 8, the frayed fibres leaving the fraying device 8 are carded in a flat carding machine 9. After intermediate storage 10 the carded web may be sent to the opening and mixing device 1.

Figure 2:
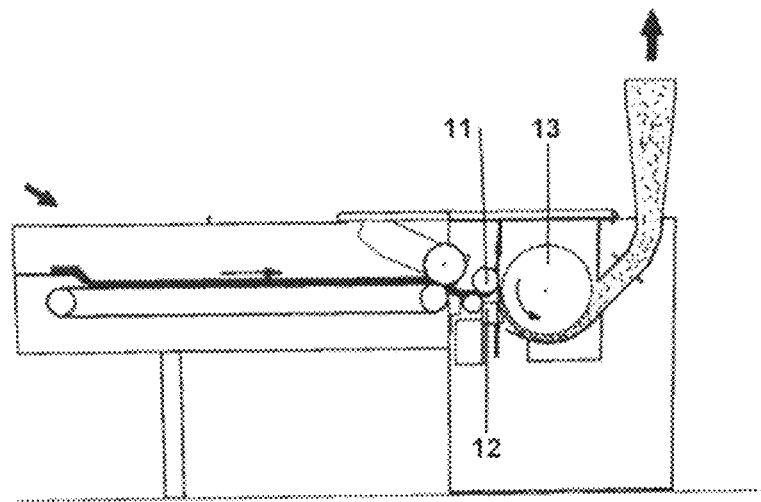
FIG. 2 is an elevation view of a fraying roller with workers.
Figure 3:
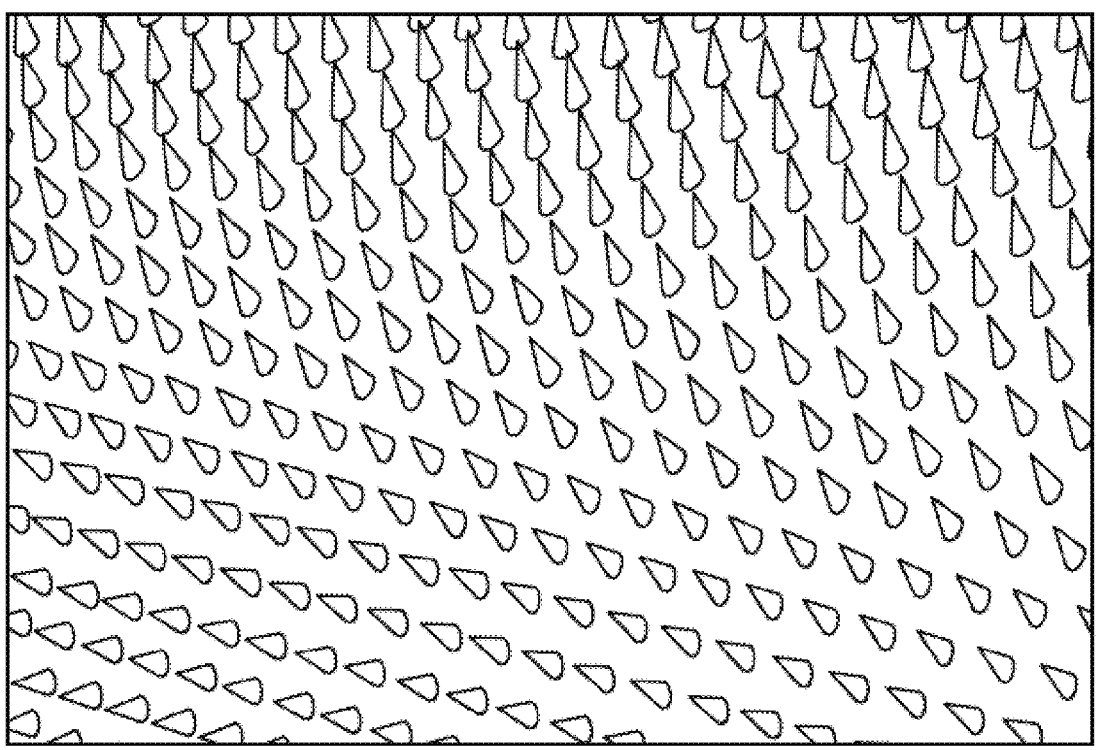
FIG. 3 shows part of the roller fitted with metal workers.
Figure 4:
FIG. 4 is a cross-sectional view of a metal worker on the fraying device.

The fraying device is shown in elevation in FIG. 2. It consists of a feed roller 11 that advances the consolidated non-woven web continuously on a table 12. A rotating roller 13 fitted with metal workers 14 shreds and frays the non-woven web when it passes over the lip of the table 12 in the space between the table 12 and the rotating roller 13. The rotating roller 13 of the fraying device is fitted with workers (FIG. 3). A worker is shown in FIG. 4. It has a height h of 15 mm and a base diameter of 3.5 mm and is made from steel, preferably stainless steel. The distance between centres of the workers is 10 mm.

Figure 5:
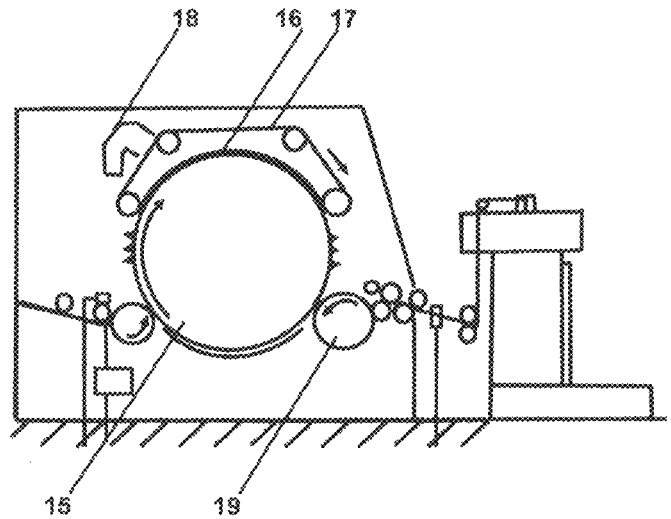
FIG. 5 is a cross-sectional view of a flat carding machine.

A flat carding machine is shown in elevation in FIG. 5. It consists mainly of a rotating drum 15. Part of the drum is enclosed by caps 16 connected in an endless chain 17. The fibres are worked between the caps 16 and the drum 15, while the caps move slowly in the direction opposite to the movement of the fibres over the drum 15. A device 18 is provided for cleaning the caps 16 on their return passage to the drum 15. A doffing roller 19 detaches the carded fibres from the drum 15.

The invention claimed is:

1. A facility for manufacturing non-wovens comprising:
a device for opening and mixing fibres to obtain opened and mixed fibres, a primary carding machine with workers for carding the opened and mixed fibres into a carded web, a consolidation device by water jets to consolidate the carded web into a consolidated web, a dryer for drying the consolidated web into a dried web, a rewinder for rewinding the dried web into a rewound web, a cutting device for cutting selvedges from the rewound web, a fraying device for fraying the selvedges frayed selvedges, a secondary carding machine without workers for carding the frayed selvedges into carded selvedges which are recycled to the device for opening and mixing fibres.

2. The facility according to claim 1, comprising a sizing device mounted upstream of the fraying device.

3. The facility according to claim 1, characterised by a cutting device downstream of the rewinder, the non-woven cutting waste from the cutting device being sent to the fraying device.

4. The facility according to claim 3, characterised in that the non-woven cutting waste is sent to the fraying device passing first through a sizing device.

* * * * *